(12) United States Patent
Johnson (10) Patent No.: US 9,752,496 B2
(45) Date of Patent: Sep. 5, 2017

(54) TURBOCHARGER WITH ELECTRICALLY COUPLED FULLY VARIABLE TURBO-COMPOUND CAPABILITY AND METHOD OF CONTROLLING THE SAME

(71) Applicant: AVL Powertrain Engineering, Inc., Plymouth, MI (US)

(72) Inventor: Gustav R. Johnson, Canton, MI (US)

(73) Assignee: AVL POWERTRAIN ENGINEERING, INC., Plymouth, MI (US)

(*) Notice: Subject to any disclaimer, the term of this patent is extended or adjusted under 35 U.S.C. 154(b) by 132 days.

(21) Appl. No.: 14/804,535

(22) Filed: Jul. 21, 2015

(65) Prior Publication Data
US 2016/0017793 A1 Jan. 21, 2016

Related U.S. Application Data

(60) Provisional application No. 62/026,751, filed on Jul. 21, 2014.

(51) Int. Cl.
*F02B 33/44* (2006.01)
*B60K 6/20* (2007.10)
(Continued)

(52) U.S. Cl.
CPC .............. *F02B 39/10* (2013.01); *F02B 37/10* (2013.01); *F02B 39/04* (2013.01); *F02B 41/10* (2013.01); *Y02T 10/144* (2013.01); *Y02T 10/163* (2013.01)

(58) Field of Classification Search
CPC .......... F02B 39/10; F02B 39/04; F02B 37/10; F02B 41/10; Y02T 10/144; Y02T 10/163
(Continued)

(56) References Cited

U.S. PATENT DOCUMENTS 1,752,224 A * 3/1930 Apple ................. B60R 16/0235
60/607
2,585,029 A * 2/1952 Nettel ..................... F02B 37/11
290/2
(Continued)

FOREIGN PATENT DOCUMENTS

GB 2263308 A * 7/1993 .............. F02B 39/04
GB 2390871 A * 1/2004 .............. F02B 39/04
(Continued)

*Primary Examiner* — Thai Ba Trieu
(74) *Attorney, Agent, or Firm* — Harness, Dickey & Pierce, P.L.C.

(57) ABSTRACT

A turbocharger apparatus of an internal combustion engine and method of controlling the same is provided with electrically coupled fully variable turbo-compound capability. The turbocharger includes an exhaust gas turbine and an intake air compressor. A first electric machine coupled to the engine generates electricity and adds power to an output shaft of the engine depending on electricity flow to and from the first electric machine. A second electric machine coupled to the turbine and/or the compressor generates electricity and drives the turbine and/or the compressor depending on electricity flow between the first and the second electric machines. A planetary gearset connects the turbine, the compressor, and the second electric machine, and varies rotational speeds of the turbine, the compressor, and the second electric machine depending on electricity flow between the first and second electric machines to maximize efficiency and power of the engine.

29 Claims, 6 Drawing Sheets (51) Int. Cl.
*F02B 33/00* (2006.01)
*F02B 63/04* (2006.01)
*F02D 29/06* (2006.01)
*F01D 15/10* (2006.01)
*F16H 3/44* (2006.01)
*F16H 47/04* (2006.01)
*F16H 47/08* (2006.01)
*F02B 39/10* (2006.01)
*F02B 39/04* (2006.01)
*F02B 37/10* (2006.01)
*F02B 41/10* (2006.01)

(58) Field of Classification Search
USPC ...... 60/607–608; 123/559.1–559.3; 475/287, 475/2, 32, 104, 110; 290/1 C, 52, 40 C, 290/40 R
See application file for complete search history.

(56) References Cited

U.S. PATENT DOCUMENTS

| | | | | |
|---|---|---|---|---|
| 3,238,713 A * | 3/1966 | Wallace | ............... | F02B 39/04 60/608 |
| 3,503,281 A * | 3/1970 | Gsching | ............... | F16H 37/00 475/32 |
| 4,514,991 A * | 5/1985 | Zinsmeyer | ............... | F16H 3/72 475/2 |
| 4,665,704 A * | 5/1987 | Hartwig | ............... | F02B 37/001 60/597 |
| 4,745,754 A | 5/1988 | Kawamura | | |
| 6,415,606 B1 * | 7/2002 | Bowman | ............... | F02B 39/10 60/608 |
| 6,718,955 B1 * | 4/2004 | Knight | ............... | F02B 39/10 60/608 |
| 7,000,601 B2 * | 2/2006 | Yasui | ............... | F02B 39/10 475/287 |
| 7,047,743 B1 | 5/2006 | Stahlhut et al. | | |
| 7,076,954 B1 * | 7/2006 | Sopko, Jr. | ............... | F02B 39/10 60/608 |
| 7,137,253 B2 * | 11/2006 | Furman | ............... | F02B 39/10 60/608 |
| 7,174,714 B2 | 2/2007 | Algrain | | |
| 7,383,684 B2 * | 6/2008 | Vuk | ............... | F02D 23/02 60/597 |
| 7,398,650 B2 * | 7/2008 | Bottcher | ............... | F02B 39/04 123/559.3 |
| 7,490,594 B2 * | 2/2009 | Van Dyne | ............... | F02B 39/04 60/608 |
| 8,225,608 B2 * | 7/2012 | Wu | ............... | F02B 39/10 60/608 |
| 8,261,550 B2 * | 9/2012 | Sartre | ............... | B60K 6/365 60/607 |
| 8,397,501 B2 * | 3/2013 | Barker | ............... | F02B 33/34 60/608 |
| 8,653,677 B2 * | 2/2014 | West | ............... | F02B 37/00 290/1 C |
| 8,668,614 B2 * | 3/2014 | Sherrill | ............... | F16H 13/10 475/183 |
| 8,991,172 B2 * | 3/2015 | Shimizu | ............... | F02B 37/10 60/608 |
| 9,482,149 B2 * | 11/2016 | Barker | ............... | B60W 10/06 |
| 2007/0137626 A1 * | 6/2007 | Turner | ............... | F02B 33/34 123/559.1 |
| 2007/0151241 A1 * | 7/2007 | Arnold | ............... | B60K 6/26 60/605.1 |
| 2009/0291803 A1 * | 11/2009 | Moeller | ............... | B60K 6/365 477/110 |
| 2010/0018203 A1 * | 1/2010 | Richards | ............... | F01D 15/10 123/559.1 |
| 2010/0083655 A1 * | 4/2010 | Frederick | ............... | F02B 37/00 60/608 |
| 2010/0170245 A1 * | 7/2010 | Amos | ............... | F02B 37/10 60/607 |
| 2013/0205773 A1 | 8/2013 | Persson et al. | | |
| 2013/0269342 A1 * | 10/2013 | Oh | ............... | F02B 39/10 60/607 |
| 2016/0319734 A1 * | 11/2016 | Milanovic | ............... | F02B 41/10 |

FOREIGN PATENT DOCUMENTS

IT    EP 0517675 A1 * 12/1992 ............. F02B 39/06
JP    2012092801 A * 5/2012

* cited by examiner

TURBOCHARGER WITH ELECTRICALLY COUPLED FULLY VARIABLE TURBO-COMPOUND CAPABILITY AND METHOD OF CONTROLLING THE SAME

CROSS-REFERENCE TO RELATED APPLICATIONS

This application claims the benefit of U.S. Provisional Application No. 62/026,751, filed on Jul. 21, 2014. The entire disclosure of the above application is incorporated herein by reference.

FIELD

The present disclosure generally relates to forced induction systems that increase the power output of an internal combustion engine. More particularly, the present disclosure describes a turbocharger of an internal combustion engine with electrically coupled and fully variable turbo-compound capability and a method of controlling the same.

BACKGROUND

This section provides background information related to the present disclosure which is not necessarily prior art.

Internal combustion engines generally include a cylinder block defining one or more cylinders. A piston is situated in each of the cylinders for movement therein in response to the combustion of an air/fuel mixture contained within each of the cylinders. Internal combustion engines were traditionally designed to be naturally aspirated, meaning that the internal combustion engine would draw intake air from the environment in response to a low pressure created within each of the cylinders by the motion of the pistons. In an effort to increase the power output and efficiency of internal combustion engines of any given size (i.e., displacement), forced induction systems where developed.

One common type of forced induction system is called a supercharger. A supercharger generally includes a compressor that is disposed along an intake tract of the internal combustion engine. The compressor of the supercharger is mechanically coupled to an engine primary shaft such that the compressor is rotatably driven by the engine primary shaft. Often, this mechanical coupling is a belt and pulley system. The compressor uses the rotational energy of the engine primary shaft to increase the flow of intake air through an intake tract of the internal combustion engine. As a result, the pressure of the intake air entering the internal combustion engine is greater, allowing for more fuel to be added to the air/fuel mixture. This ultimately increases the power output of the internal combustion engine without changing its displacement.

When appropriately designed, supercharged engines can also be more fuel efficient when compared to naturally aspirated engines. Superchargers are especially beneficial because even at low engine operating speeds the compressor of the supercharger increases the pressure of the intake air resulting in instantaneous throttle response and a more linear increase in power output. Accordingly, superchargers do not suffer from any "lag" in power application.

Despite the foregoing benefits, superchargers have known disadvantages. First, superchargers increase the parasitic losses of an internal combustion engine because the internal combustion engine's own rotational power is used to drive the compressor. Such parasitic losses increase significantly at high engine operating speeds. Accordingly, some of the power output and efficiency gains associated with forced induction are cancelled out by the parasitic drag of the compressor. Second, the mechanical coupling between the engine primary shaft and the compressor transfers the torsional vibrations of the engine primary shaft to the compressor. Such torsional vibrations can decrease the performance and reliability of the compressor over time.

A second common type of forced induction system is called a turbocharger. Like a supercharger, the turbocharger also includes a compressor that is disposed along the intake tract of the internal combustion engine. Rotation of the compressor increases the flow of intake air through the intake tract, which increases the pressure of the intake air entering the internal combustion engine. Again, this allows for more fuel to be added to the air/fuel mixture and ultimately increases the power output of the internal combustion engine without changing its displacement. However, unlike with the supercharger, the compressor of the turbocharger is driven by a turbine that is propelled by exhaust gases produced by the internal combustion engine.

The turbine of the turbocharger is disposed along an exhaust tract of the internal combustion engine. The turbine generally includes a plurality of turbine vanes that rotationally drive the turbine in response to exhaust gas flowing through the exhaust tract. Accordingly, a turbocharger is most effective at high engine operating speeds where exhaust gas flow is great. When appropriately designed, turbocharged engines can also be more fuel efficient when compared to both naturally aspirated engines and supercharged engines.

Because the turbocharger is powered by the latent energy of the exhaust gases, the turbocharger does not increase the parasitic drag on the internal combustion engine like a supercharger does. Further, because there is no mechanical coupling between the engine primary shaft and the compressor, torsional vibrations of the engine primary shaft are not transmitted to the compressor of the turbocharger.

Despite the foregoing benefits, turbochargers also have known disadvantages. Increasing the flow of intake air to the internal combustion engine is dependent on the flow of exhaust gases expelled from the internal combustion engine. This leads to a phenomenon known as "turbo lag." Turbo lag refers to delayed throttle response in a turbocharged engine. This characteristic occurs because there is a time delay between rapid throttle increases and an associated increase in exhaust gas flow. Accordingly, in a turbocharged engine there is a time delay between throttle increases and associated power increases of the internal combustion engine because the turbine must be allowed some time to "spool up" as exhaust gas flow increases. Another problem with turbocharged engines is that there are times where the compressor increases intake air flow beyond the requirements of the internal combustion engine. For example, this occurs when exhaust gas flow is high and the throttle is decreased. The excessive intake air pressure may be relieved from the intake tract by a device called a blow-off valve. The blow-off valve is connected in fluid communication with the intake tract and operates to release intake air from the intake tract when the pressure of the intake air exceeds a threshold value. A device called a wastegate may also be used to divert exhaust gases away from the turbine when the intake air flow generated by the compressor exceeds the requirements of the internal combustion engine. The blow-off of intake air and/or the bypassing of exhaust gases are losses that waste energy.

SUMMARY

This section provides a general summary of the disclosure, and is not a comprehensive disclosure of its full scope or all of its features.

The subject disclosure provides a forced induction system with increased efficiency. In accordance with this design, a turbocharger apparatus of an internal combustion engine is provided with electrically coupled and fully variable turbocompound capability. The turbocharger apparatus disclosed includes a turbine and a compressor. The turbine is disposed in fluid communication with exhaust gases flowing from an internal combustion engine and the compressor is disposed in fluid communication with intake air flowing toward the internal combustion engine.

In accordance with one aspect of the subject disclosure, the turbocharger apparatus may include an electric machine that is rotatably coupled to at least one: (i) of the turbine and (ii) the compressor. The electric machine has an electricity generating state and an electricity consuming state. In the electricity generating state, the electric machine generates electricity such that electricity flows from the electric machine. In the electricity consuming state, electricity flows to the electric machine such that the electric machine rotationally drives at least one of: (i) the turbine and (ii) the compressor. A planetary gearset connects the turbine, the compressor, and the electric machine. During operation, the planetary gearset varies the rotational speeds of the turbine, the compressor, and the electric machine with respect to one another depending on electricity flow to and from the electric machine. In so doing, the efficiency and power of the internal combustion engine can be maximized. It should be appreciated that the electric machine may be electrically connected to an electricity source via an electrical power coupling. By way of example and without limitation, the electricity source may be a battery or another electric machine that is rotatably coupled to the internal combustion engine.

In accordance with another aspect of the subject disclosure, the turbocharger apparatus may include a first electric machine and a second electric machine. The first electric machine is coupled to the internal combustion engine and has an electricity generating state and an electricity consuming state. In the electricity generating state, the first electric machine generates electricity such that electricity flows from the first electric machine. In the electricity consuming state, electricity flows to the first electric machine such that the first electric machine adds rotational power to the internal combustion engine. The second electric machine is coupled to at least one of: (i) the turbine and (ii) the compressor. The second electric machine also has an electricity generating state and an electricity consuming state. In the electricity generating state, the second electric machine generates electricity such that electricity flows from the second electric machine. In the electricity consuming state, electricity flows to the second electric machine such that the second electric machine rotationally drives at least one of: (i) the turbine and (ii) the compressor. The planetary gearset connects the turbine, the compressor, and the second electric machine. The planetary gearset varies the rotational speeds of the turbine, the compressor, and the second electric machine with respect to one another depending on electricity flow to and from the second electric machine in order to maximize the efficiency and power of the internal combustion engine across a range of engine operating speeds. It should be appreciated that the first electric machine and the second electric machine may be electrically connected by the electrical power coupling such that electricity flows between the first electric machine and the second electric machine. In accordance with yet another aspect of the subject disclosure, a method of controlling the turbocharger apparatus described herein is provided.

Advantageously, the turbocharger apparatus and method disclosed reduce or eliminate the disadvantages associated with traditional superchargers and turbochargers. At low engine operating speeds, the first electric machine may generate electricity from the rotational energy of the internal combustion engine. This electricity flows to the second electric machine, which drives the compressor through the planetary gearset at a rotational speed that exceeds the rotational speed of the turbine. Accordingly, the compressor increases the intake air flow at low engine operating speeds to reduce or eliminate turbo lag. Alternatively, the second electric machine may receive electricity from a battery or other electricity source when the internal combustion engine is operating at low engine operating speeds. At high engine operating speeds, the planetary gearset may fix the second electric machine in place such that all of the mechanical power generated by the turbine is transferred to the compressor. Here, the second electric machine has no electricity draw, as the second electric machine is not driving the compressor via the planetary gearset. Thus, the first electric machine does not generate electricity from the rotational energy of the internal combustion engine and there is no parasitic losses associated with the turbocharger apparatus at high engine operating speeds.

At engine operating speeds where the intake air flow exceeds the requirements of the internal combustion engine, the planetary gearset may sync rotation of the turbine with rotation of the compressor such that any excess mechanical power generated by the turbine is absorbed by the second electric machine. The second electric machine generates electricity from this excess mechanical power. The electricity generated by the second electric machine may flow to the first electric machine, which can use the electricity to add rotational power to that produced by the internal combustion engine. Alternatively, the electricity generated by the second electric machine may flow to the battery or other energy source for storage or usage by other electricity consuming components of the internal combustion engine or vehicle. Accordingly, energy is not wasted when the intake air flow through the compressor exceeds the requirements of the internal combustion engine. Further, the turbocharger apparatus disclosed provides increased flexibility as the power split between the turbine, the compressor, the first electric machine, and the second electric machine is infinitely variable.

In addition to these efficiency related advantages, the turbocharger apparatus and method disclosed eliminate the transfer of torsional vibration from the internal combustion engine to the compressor because the mechanical coupling used in traditional superchargers is replaced by an electrical power coupling. Therefore, the performance and reliability of the compressor is increased. Also, the turbocharger apparatus disclosed allows for greater packaging flexibility, as the first and second electric machines are not mechanically coupled and, thus, do not need to be aligned relative to one another.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
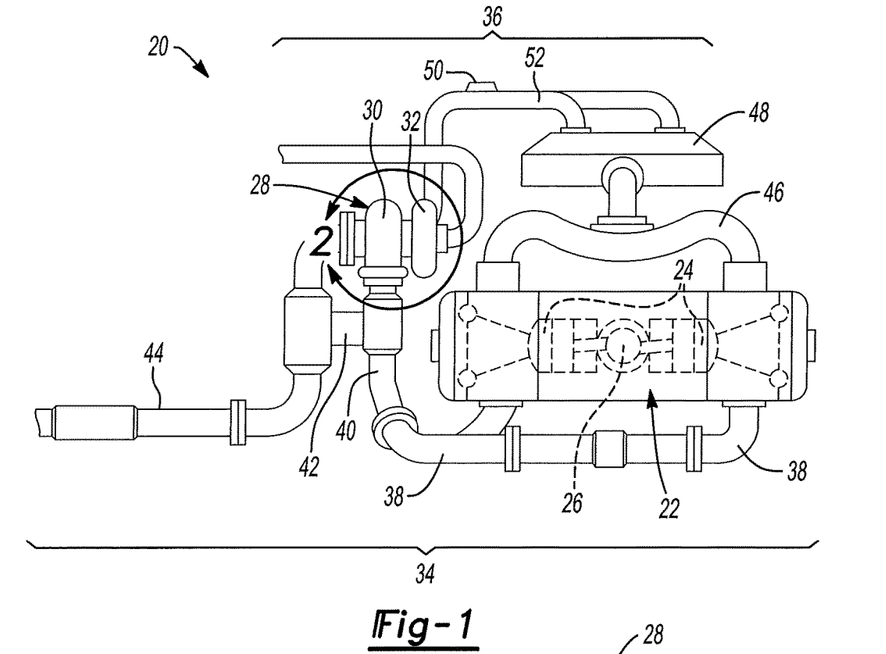
FIG. 1 is a top elevation view illustrating an exemplary turbocharger apparatus connected to an exemplary internal combustion engine.

Referring to the Figures, generally wherein like numerals indicate corresponding parts throughout the several views, a turbocharger apparatus 20 of an internal combustion engine 22 is disclosed. As will be explained in greater detail below, the turbocharger apparatus 20 is electrically coupled and has fully variable turbo-compound capability. It should be appreciated that the term "internal combustion engine" as used throughout the present disclosure generally refers to any engine that utilizes an internal combustion process to generate power, including without limitation, two-stroke and four-stroke engines. As such, the internal combustion engine 22 may be a spark ignition engine (e.g., a gasoline engine) or a compression ignition engine (e.g. a diesel engine). With reference to FIG. 1, the internal combustion engine 22 draws intake air from the surrounding environment. Inside the internal combustion engine 22, the intake air is mixed with fuel to create an air/fuel mixture. The air/fuel mixture is then ignited within one or more cylinders 24 of the internal combustion engine 22. The ignition and combustion of the air/fuel mixture produces power, which is output from the internal combustion engine 22 by rotation of an engine primary shaft 26. The ignition and combustion of the air/fuel mixture also produces exhaust gases as a by-product that are expelled from the one or more cylinders 24 of the internal combustion engine 22.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
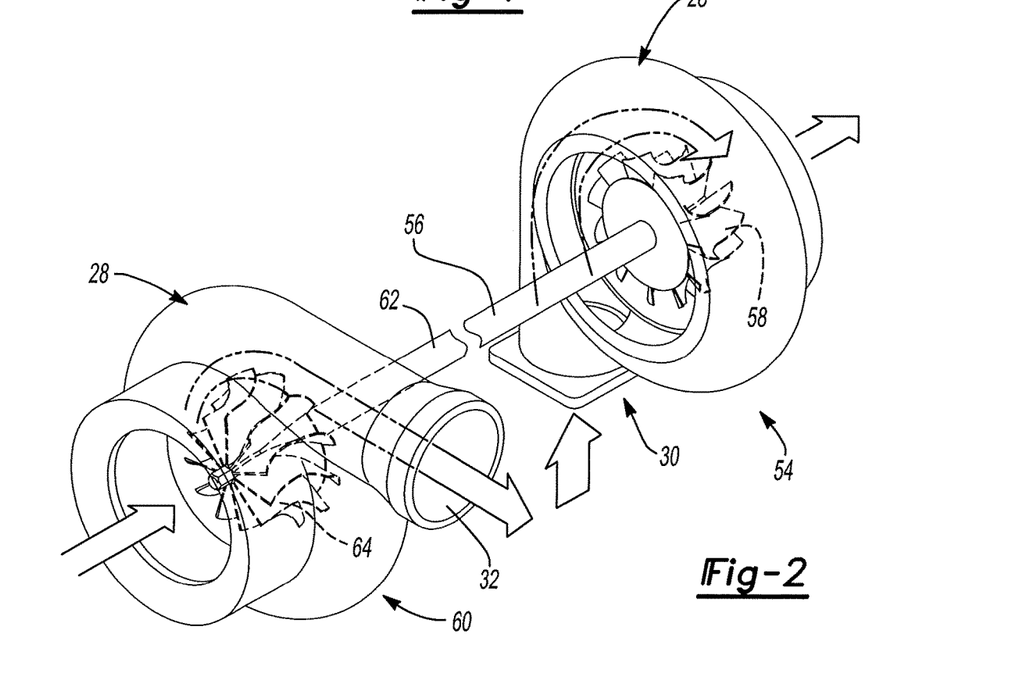
FIG. 2 is a partial perspective view illustrating an exemplary compressor and turbine of the exemplary turbocharger apparatus illustrated in FIG. 1.

With reference to FIGS. 1 and 2, the turbocharger apparatus 20 disclosed includes a turbocharger housing 28. The turbocharger housing 28 defines an exhaust passage 30 and an intake passage 32. The exhaust passage 30 of the turbocharger housing 28 communicates exhaust gases away from the internal combustion engine 22 while the intake passage 32 of the turbocharger housing 28 communicates intake air towards the internal combustion engine 22. The turbocharger housing 28 may be made of a variety of different materials, including without limitation, aluminum alloy, steel alloy, and cast iron. It should be appreciated that the intake passage 32 and the exhaust passage 30 of the turbocharger housing 28 may or may not directly abut the internal combustion engine 22. Where the intake passage 32 and the exhaust passage 30 of the turbocharger housing 28 are spaced from the internal combustion engine 22, the turbocharger apparatus 20 may include an exhaust tract 34 and an intake tract 36.

The exhaust tract 34 is disposed in fluid communication with the exhaust passage 30 and extends between the turbocharger housing 28 and the internal combustion engine 22 to transport the exhaust gases from the internal combustion engine 22 to the exhaust passage 30. The exhaust tract 34 may be comprised of a single component or multiple components. As is known in the art, the exhaust tract 34 may include, without limitation, an exhaust manifold 38, an up pipe 40, a wastegate 42, and an exhaust pipe 44. Thus, the exhaust tract 34 and its associated components may be made of a variety of different materials including, without limitation, aluminum alloy, steel alloy, and cast iron.

The intake tract 36 is disposed in fluid communication with the intake passage 32 and extends between the turbocharger housing 28 and the internal combustion engine 22 to transport the intake air from the intake passage 32 to the internal combustion engine 22. The intake tract 36 may be comprised of a single component or multiple components. As is known in the art, the intake tract 36 may include, without limitation, an intake manifold 46, an intercooler 48, a blow-off valve 50, and an intercooler inlet hose 52. Thus, the intake tract 36 and its associated components may be made of a variety of different materials including, without limitation, aluminum alloy, steel alloy, polymeric compounds, and rubber compounds.

As best seen in FIG. 2, the turbocharger apparatus 20 includes a turbine 54 that is at least partially disposed within the exhaust passage 30 of the turbocharger housing 28. The turbine 54 includes a turbine shaft 56 and a plurality of turbine vanes 58 that are rotatably coupled with the turbine shaft 56. It should be appreciated that the plurality of turbine vanes 58 may be integrally formed with the turbine shaft 56 or may alternatively be separate components that are coupled with the turbine shaft 56. Where the plurality of turbine vanes 58 are separate components, the plurality of turbine vanes 58 may be directly fixed to the turbine shaft 56 or may be moveably attached to the turbine shaft 56 such that the angle and pitch of the plurality of turbine vanes 58 can be adjusted based on operating conditions of the turbocharger apparatus 20. Accordingly, the turbine shaft 56 and the plurality of turbine vanes 58 may be made of a variety of different materials including, without limitation, aluminum alloy, steel alloy, titanium alloy, cast iron, and ceramic compounds. During operation of the internal combustion engine 22, the plurality of turbine vanes 58 are acted on by exhaust gases flowing through the exhaust passage 30 to rotationally drive the turbine shaft 56. Stated another way, the turbine 54 is rotationally propelled by the exhaust gases flowing through the exhaust passage 30 of the turbocharger housing 28.

The turbocharger apparatus 20 also includes a compressor 60 that is at least partially disposed within the intake passage 32 of the turbocharger housing 28. The compressor 60 includes a compressor shaft 62 and a plurality of compressor vanes 64 that are rotatably coupled with the compressor shaft 62. It should be appreciated that the plurality of compressor vanes 64 may be integrally formed with the compressor shaft 62 or may alternatively be separate components that are coupled with the compressor shaft 62. Where the plurality of compressor vanes 64 are separate components, the plurality of compressor vanes 64 may be directly fixed to the compressor shaft 62 or may be moveably attached to the compressor shaft 62 such that the angle and pitch of the plurality of compressor vanes 64 can be adjusted based on operating conditions of the turbocharger apparatus 20. Accordingly, the compressor shaft 62 and the plurality of compressor vanes 64 may be made of a variety of different materials including, without limitation, aluminum alloy, steel alloy, titanium alloy, cast iron, and ceramic compounds. During operation of the internal combustion engine 22, the plurality of compressor vanes 64 are rotatably driven by the compressor shaft 62 and thereby increase the flow of intake air through the intake passage 32.

Figure 3:
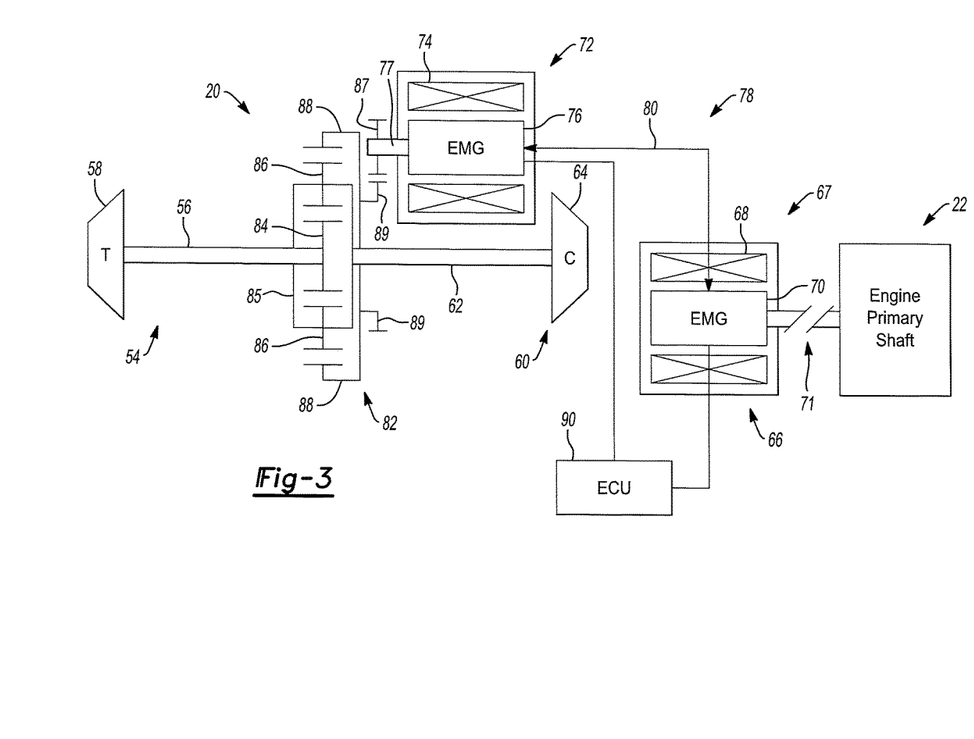
FIG. 3 is a schematic diagram illustrating an exemplary turbocharger apparatus constructed in accordance with the present disclosure.

Referring to FIG. 3, a first electric machine 66 (i.e. EMG) is rotatably coupled to the internal combustion engine 22 by coupler 67. It should be appreciated that the first electric machine 66 may be characterized as an electric motor and as an electric generator depending on whether electricity is flowing to the first electric machine 66 or flowing from the first electric machine 66. As such, the first electric machine 66 acts as an electricity source 67 when the first electric machine 66 is generating electricity. The first electric machine 66 has several operational states including an electricity generating state and an electricity consuming state. In the electricity generating state, the first electric machine 66 generates electricity such that electricity flows from the first electric machine 66. In other words, the first electric machine 66 converts some of the rotational power produced by the internal combustion engine 22 into electricity in the electricity generating state. In the electricity consuming state, electricity flows to the first electric machine 66 such that the first electric machine 66 adds rotational power to the internal combustion engine 22. In other words, the vehicle is driven by both the internal combustion engine 22 and the first electric machine 66 when the first electric machine 66 is in the electricity consuming state.

The first electric machine 66 includes a first stator 68 and a first rotor 70, whereby the rotor 70 is rotatably coupled to the internal combustion engine 22 via the engine primary shaft 26. At least a portion of the first rotor 70 is rotatably supported within the first stator 68 such that the first rotor 70 rotates with respect to the first stator 68 to generate electricity or to add rotational power to the internal combustion engine 22.

Figure 4:
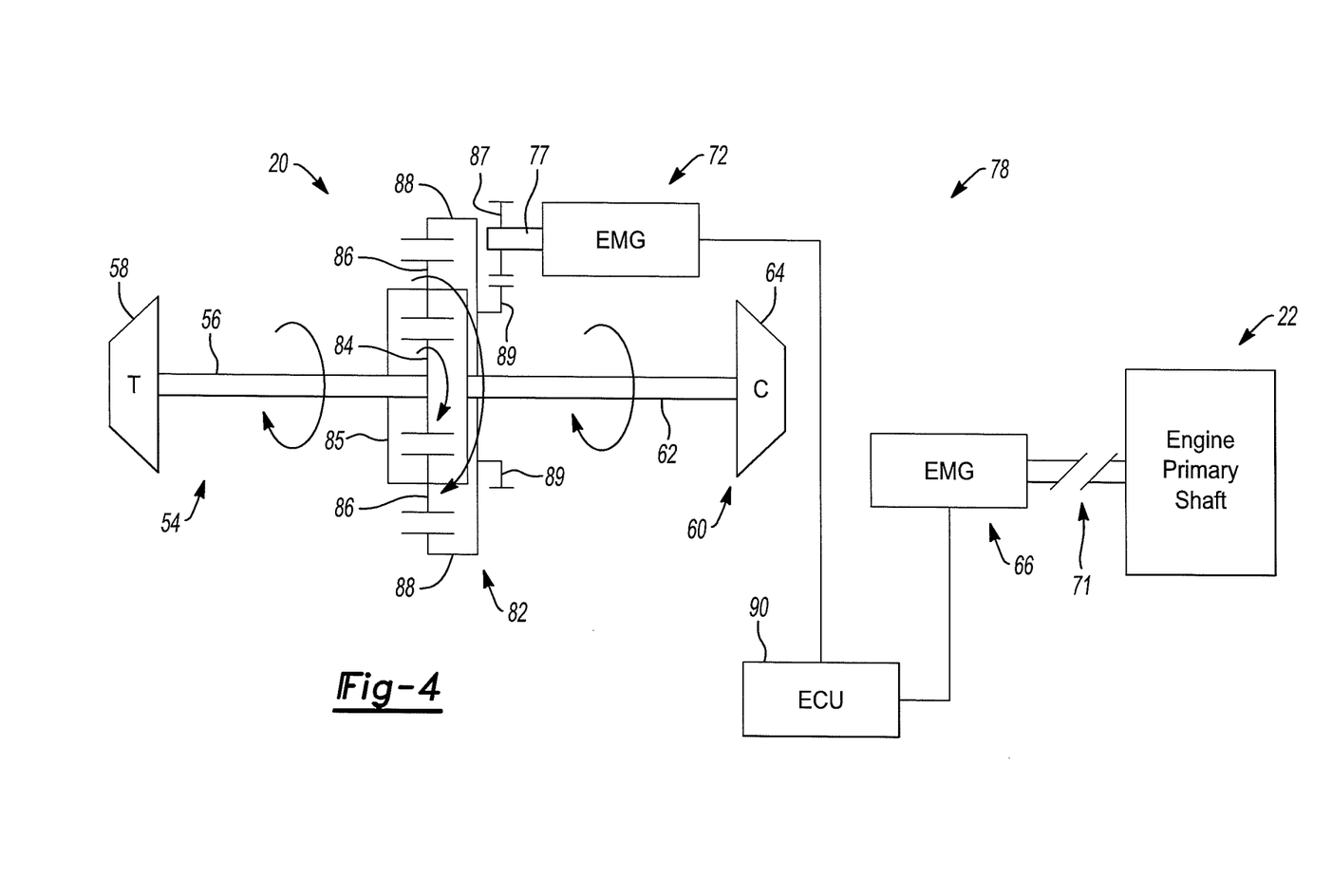
FIG. 4 is another schematic diagram of the exemplary turbocharger apparatus illustrated in FIG. 3 showing a second electric machine holding a ring gear of a planetary gearset in place such that all of the power generated by the turbine is transferred to the compressor.
Figure 5:
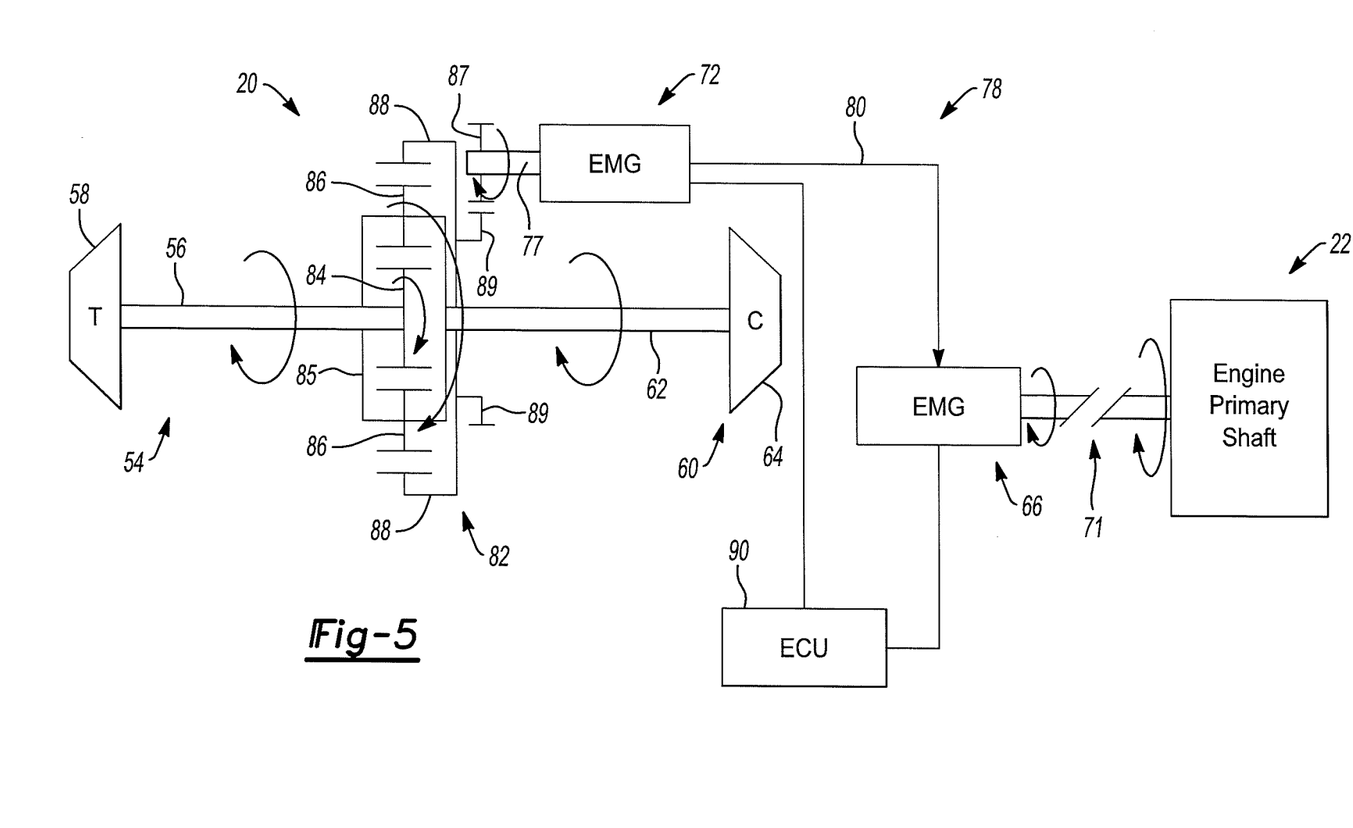
FIG. 5 is another schematic diagram of the exemplary turbocharger apparatus illustrated in FIG. 3 showing the second electric machine generating electricity by receiving rotational power from the ring gear of the planetary gearset and a first electric machine using that electricity to add rotational power to an engine primary shaft.
Figure 6:
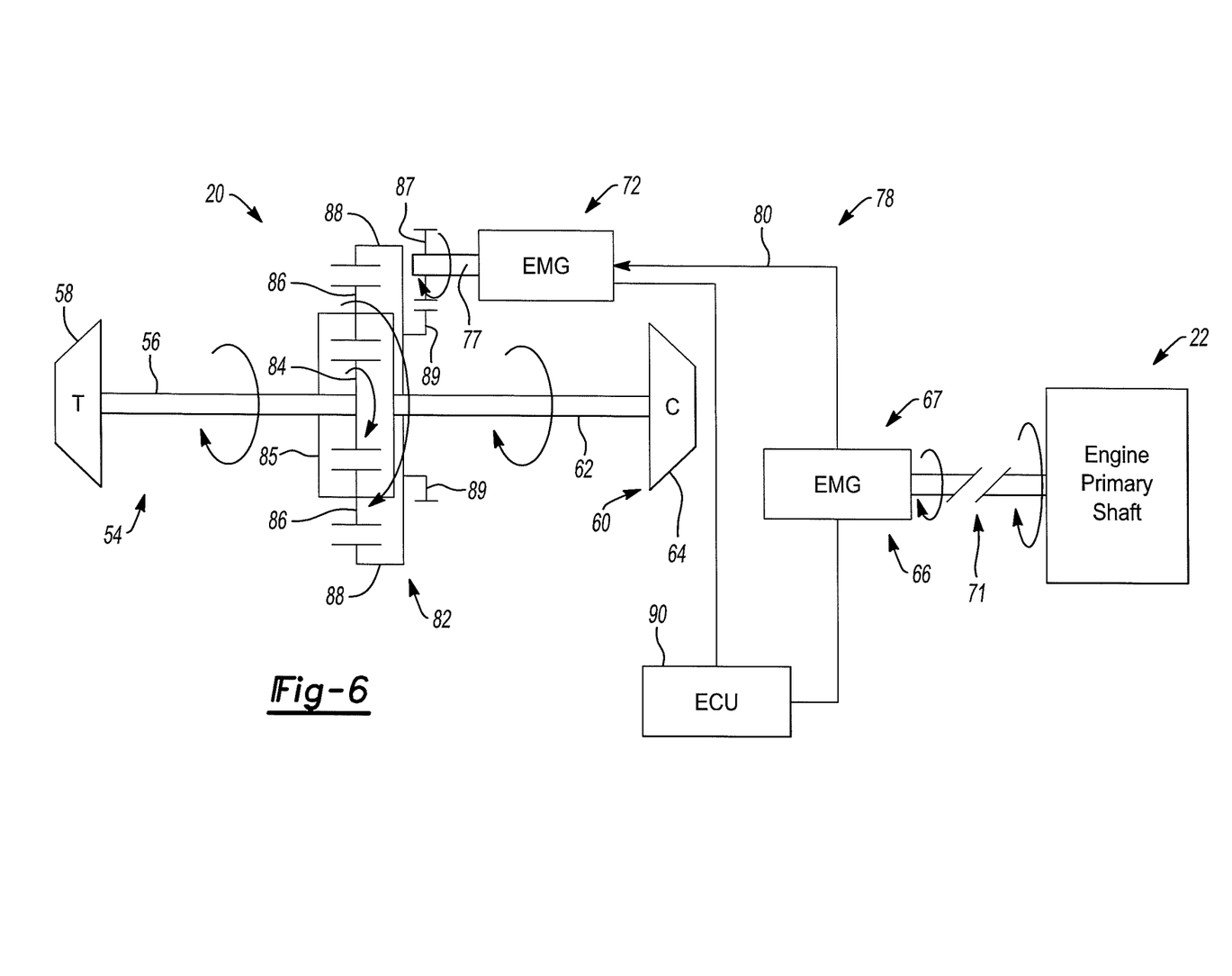
FIG. 6 is another schematic diagram of the exemplary turbocharger apparatus illustrated in FIG. 3 showing the first electric machine generating electricity by receiving rotational power from the engine primary shaft and the second electric machine using that electricity to add rotational power to at least one of the turbine and the compressor.

When electricity is supplied to the first electric machine 66 (i.e. when the first electric machine 66 is in the electricity consuming state), as shown in FIG. 5, the first rotor 70 is rotationally driven by the first electric machine 66 which, in turn, rotationally drives the engine primary shaft 26. Accordingly, the first electric machine 66 increases or boosts the power output of the internal combustion engine 22. In contrast, an electrical load can be applied to the first electric machine 66 such that the first electric motor absorbs part of the power output of the internal combustion engine 22 to generate electricity. When an electrical load is placed on the first electric machine 66 (i.e. when the first electric machine 66 is in the electricity generating state), the engine primary shaft 26 drives the first rotor 70 such that electricity is generated by the first electric machine 66, as shown in FIG. 6. Where no electrical load is placed on the first electric machine 66 and where no electricity is supplied to the first electric machine 66, as shown in FIG. 4, the first rotor 70 simply spins with the engine primary shaft 26 and the first electric machine 66 neither generates electricity nor adds rotational power to the internal combustion engine 22. It should also be appreciated that the first electric machine 66 may be disconnected from the engine primary shaft 26 when not being used to generate electricity or add rotational power to the engine primary shaft 26 of the internal combustion engine 22. The first electric machine 66 may be disconnected from the engine primary shaft 26 via coupler 71. By way of example and without limitation, the coupler 71 may optionally include a clutch assembly (not shown) that selectably couples the engine primary shaft 26 and the first rotor 70. As such, the coupler 71 may contain one or more friction plates, dog clutches, and/or mechanical diodes.

Again referring to FIG. 3, a second electric machine 72 (i.e. EMG) is coupled to the turbine 54, the compressor 60, or both. As such, the second electric machine 72 may be coupled to the turbine 54 alone, the compressor 60 alone, or both the turbine 54 and the compressor 60. Like with the first electric machine 66, the second electric machine 72 may be characterized as an electric motor and as an electric generator depending on electricity flow between the first electric machine 66 and the second electric machine 72. The second electric machine 72 also has several operational states including an electricity generating state and an electricity consuming state. In the electricity generating state, the second electric machine 72 generates electricity such that electricity flows from the second electric machine 72. In other words, the second electric machine 72 converts some or all of the excess rotational energy produced by the turbine 54 into electricity in the electricity generating state. In the electricity consuming state, electricity flows to the second electric machine 72 such that the second electric machine 72 rotationally drives the turbine 54, the compressor 60, or both. In other words, the turbine 54 is driven by the exhaust gasses flowing through the exhaust passage 30 in the turbine housing 28 and the second electric machine 72 help drive the turbine 54, the compressor 60, or both when the second electric machine 72 is in the electricity consuming state. It should be appreciated that regardless of whether the second electric machine 72 drives the turbine 54, the compressor 60, or both, the end result is an increase in the flow rate of the intake air leaving the compressor 60.

The second electric machine 72 includes a second stator 74 and a second rotor 76 that is rotatably coupled to the turbine shaft 56, the compressor shaft 62, or both. The second electric machine 72 may also include a rotating shaft 77 that is rotatably coupled with the second rotor 76. Optionally, part of the second rotor 76 may form the rotating shaft 77 such that the rotating shaft 77 is integral with the second rotor 76. At least a portion of the second rotor 76 is rotatably supported within the second stator 74 such that the second rotor 76 rotates with respect to the second stator 74 to generate electricity or to add rotational power to the compressor 60. When electricity is supplied to the second electric machine 72 (i.e. when the second electric machine 72 is in the electricity consuming state), as shown in FIG. 6, the second rotor 76 is rotationally driven by the second electric machine 72 which, in turn, rotationally drives the turbine shaft 56, the compressor shaft 62, or both. Because the turbine 54 drives the compressor 60, if the second electric machine 72 increases or boosts the power output of the turbine 54, the power input to the compressor 60 also increases accordingly. Thus, the second electric machine 72 can be used to increase the rotational speed of the compressor 60 and therefore the flow of intake air supplied to the internal combustion engine 22. In other words, the second electric machine 72 can be used to augment the rotational power that the turbine 54 provides to the compressor 60. In contrast, an electrical load can be placed on the second electric machine 72 such that the second electric machine 72 absorbs part of the power output of the turbine 54 to generate electricity. When an electrical load is placed on the second electric machine 72 (i.e. when the second electric machine 72 is in the electricity generating state), the turbine shaft 56, the compressor shaft 62, or both drive the second rotor 76 such that electricity is generated by the second electric machine 72, as shown in FIG. 5.

The first electric machine 66 and the second electric machine 72 are part of an electrical circuit 78 such that electricity may be transferred back and forth between the first electric machine 66 and the second electric machine 72. While the electrical circuit 78 may include a variety of electrical components, the electrical circuit 78 may include an electrical power coupling 80 that is electrically connected to the first electric machine 66 and the second electric machine 72. The electrical power coupling 80 transports electricity between the first electric machine 66 and the second electric machine 72. For example and without limitation, the electrical power coupling 80 may be a conductive wire. In addition, the electrical power coupling 80 may be connected to other electrical components, including without limitation, to an electricity storage device (not shown) such as one or more batteries. Accordingly, electricity that the first electric machine 66 generates by absorbing power from the engine primary shaft 26 can be supplied to the second electric machine 72 to help drive the turbine 54 and/or the compressor 60 via the electrical power coupling 80. Similarly, electricity that the second electric machine 72 generates by absorbing power from the turbine 54 and/or the compressor 60 can be supplied to the first electric machine 66 to help drive the engine primary shaft 26 via the electrical power coupling 80.

In accordance with the subject disclosure, the turbine shaft 56 and the compressor shaft 62 are not directly connected to one another. Instead, the turbocharger apparatus 20 includes a planetary gearset 82 connecting the turbine shaft 56 and the compressor shaft 62. Accordingly, the turbine shaft 56 and the compressor shaft 62 are not limited to having the same rotational speed. The planetary gearset 82 of the disclosed turbocharger apparatus 20 varies the rotational speeds of the turbine 54, the compressor 60, and the second rotor 76 of the second electric machine 72 with respect to one another depending upon the electricity flow between the first electric machine 66 and the second electric machine 72. Advantageously, this maximizes the efficiency and power of the internal combustion engine 22 across a range of engine operating speeds. While the planetary gearset 82 may have a variety of different configurations, the planetary gearset 82 may generally include a sun gear 84, one or more planet gears 86, and a ring gear 88. The sun gear 84 of the planetary gearset 82 is rotatably coupled with the turbine shaft 56. The ring gear 88 is disposed circumferentially about and radially spaced from the sun gear 84 and is rotatably coupled with the second rotor 76 of the second electric machine 72. The planet gears 86 are disposed radially between and in meshing engagement with the sun gear 84 and the ring gear 88. The planet gears 86 are carried on a carrier 85 that is rotatably coupled with the compressor shaft 62. In other words, the planet gears 86 are pivotally supported on the carrier 85 at one or more circumferentially spaced locations such the planet gears 86 drive rotation of the carrier 85 as the planet gears 86 orbit the sun gear 84. As noted above, the second electric motor 72 is rotatably coupled to the ring gear 88. Although several configurations are possible, in the example illustrated in the Figures, an auxiliary gear 87 is rotatably coupled to and carried on the rotating shaft 77 of the second electric machine 72. Meanwhile, a transfer gear 89 rotatably coupled to and extending from the ring gear 88 is disposed in meshing engagement with the auxiliary gear 87. Accordingly, the auxiliary gear 87 and the transfer gear 89 rotatably couple the ring gear 88 to the second electric machine 72.

As shown in FIG. 4, the planetary gearset 82 of the disclosed turbocharger apparatus 20 may provide a first ratio where the second electric machine 72 holds the ring gear 88 fixed by locking the rotating shaft 77 in place (i.e. the second electric machine 72 prevents the rotation of the rotating shaft 77). The turbine 54 rotates the sun gear 84 and the planet gears 86 ride the ring gear 88 in the same direction as the sun gear 84, causing the carrier 85 and therefore the compressor gear 60 to rotate in the same direction. Thus, all mechanical power generated by the turbine 54 is transferred through the planetary gearset 82 to the compressor 60 when the first ratio of the planetary gearset 82 is selected. Because the second electric machine 72 does not generate electricity to drive the ring gear 88, the second electric machine 72 does not generate an electrical load and therefore the first electric machine 66 does not absorb rotational power from the internal combustion engine 22 in the first ratio. Because the rotating shaft 77 of the second electric machine 72 is locked in place and is not rotationally driven by the ring gear 88, the second electric machine 72 does not generate electricity and therefore does not absorb rotational power from the turbine 54 or the compressor 60. Accordingly, the turbocharger apparatus 20 acts as a conventional turbocharger when the first ratio is selected and all of the attendant benefits of conventional turbochargers are realized in this operating mode. For example, the first ratio may be selected at high engine operating speeds where the flow of exhaust gases through the exhaust passage 30 is sufficient to drive the turbine 54, and thus, the compressor 60 at high rotational speeds. Enhanced efficiency and power output of the internal combustion engine 22 may be realized because the first and second electric machines 66, 72 are not adding any load to the internal combustion engine 22 or the turbine 54 and/or the compressor 60.

As shown in FIG. 5, the planetary gearset 82 may also provide a second ratio where the second electric machine 72 limits rotation of the ring gear 88 to a rotational speed that equals a rotational speed of the sun gear 84 and, thus, the turbine shaft 56. When the second ratio is selected, any excess mechanical power generated by the turbine 54 is transferred to the second electric machine 72 through the transfer gear 89 and the auxiliary gear 87. The second electric machine 72 generates electricity from the excess mechanical power it receives from the turbine 54. In other words, the second electrical machine 72 acts like a brake when the second ratio is selected to prevent the ring gear 88 from overrunning the sun gear 84 by absorbing the excess mechanical power produced by the turbine 54 and converting it to electricity. The electricity that is generated by the second electric machine 72 is communicated to the first electric machine 66 via the electrical power coupling 80 where the first electric machine 66 uses the electricity to add rotational power to the engine primary shaft 26. The second ratio may be selected, for example, when the flow of the intake air exceeds the requirements of the internal combustion engine 22. Thus, in the second ratio, the disclosed turbocharger apparatus 20 harnesses the excess energy of the turbine 54 and uses it to augment the power output of the internal combustion engine 22 to maximize efficiency.

As shown in FIG. 6, the planetary gearset 82 may also provide a third ratio where the second electric machine 72 rotates the ring gear 88 at a rotational speed that exceeds a rotational speed of the sun gear 84 and, thus, the turbine shaft 56. The second electric machine 72 supplies additional rotational energy to the planet gears 86 and the compressor shaft 62 via the auxiliary gear 87, the transfer gear 89, and the ring gear 88 to further increase the flow of the intake air to the internal combustion engine 22. Because the second electric machine 72 helps drive the compressor shaft 62 when the third ratio is selected, the second electric machine 72 draws electricity from the electrical power coupling 80. This creates an electrical load on the first electric machine 66, forcing the first electric machine 66 to absorb rotational power from the engine primary shaft 26 to generate the electricity required by the second electric machine 72. The third ratio may be selected, for example, at low engine operating speeds when the flow of the intake air is less than the requirements of the internal combustion engine 22. As such, the first and second electric machines 66, 72, the compressor 60, and the electrical power coupling 80 act in concert to achieve results similar to that of a conventional supercharger where there is no time lag between throttle increases and an increase in the flow of intake air supplied to the internal combustion engine 22 by the compressor 60. Additional benefits are also realized. The turbocharger apparatus 20 disclosed does not transfer torsional vibration from the internal combustion engine 22 to the compressor 60, as the coupling between the engine primary shaft 26 and the compressor 60 is electrical and not mechanical. Further, the turbocharger apparatus 20 disclosed allows for greater packaging flexibility, as the first and second electric machines 66, 72 are not mechanically coupled and, thus, have no required relative alignment with one another.

It should be appreciated that the planetary gearset 82 can provide an infinite number of ratios by adjusting the relative rotational speeds of the ring gear 88 with respect to the sun gear 84 and the planet gears 86. For example, instead of completely locking the ring gear 88 in place with respect to the second stator 74, the second electric machine 72 can permit various degrees of slip wherein the ring gear 88 rotates at a rotational speed that is less than the rotational speed of the sun gear 84 and, thus, the turbine 54. Similarly, the second electric machine 72 may drive the ring gear 88 at a variety of rotational speeds that exceed the rotational speed of the sun gear 84 and, thus, the turbine 54 to add varying amounts of rotational power to the compressor 60. As a result, the turbocharger apparatus 20 has significant on-the-fly flexibility that allows the interplay between the first and second electric machines 66, 72 to vary with the operating parameters of the internal combustion engine 22, the turbine 54, and the compressor 62.

It should also be appreciated that where no electrical load is placed on the second electric machine 72 and where no electricity is supplied to the second electric machine 72, the second rotor 76 simply spins with the turbine shaft 56, the compressor shaft 62, or both and the second electric machine 72 neither generates electricity nor adds rotational power to the turbine shaft 56 and/or the compressor shaft 62. Therefore, the second electric machine 72 may be disconnected from the turbine shaft 56, the compressor shaft 62, or both the turbine shaft 56 and the compressor shaft 62 when the second electric machine 72 is not being used to generate electricity or increase the power output of the turbine 54 and/or the power input of the compressor 60. By way of example and without limitation, the second electric machine 72 may be disconnected from the turbine shaft 56 and the compressor shaft 62 via disengagement of ring gear 88 or transfer gear 89. That is, the ring gear 88 may be disengaged from the sun gear 84 and/or the planet gears 86 or the transfer gear 89 may be disengaged from the auxiliary gear 87 so that the compressor shaft 62 and/or the turbine shaft 56 can rotate independently from rotation of the second rotor 76 of the second electric machine 72.

With reference to FIG. 3-6, the disclosed turbocharger apparatus 20 further includes a controller 90 (i.e. ECU) in electrical communication with the first electric machine 66 and the second electric machine 72. The controller 90 controls a direction and an intensity of electricity flow to and from the first electric machine 66 and the second electric machine 72 and/or between the first electric machine 66 and the second electric machine 72. By adjusting the electrical load experienced by each of the first electric machine 66 and the second electric machine 72, the controller 90 can thereby control electricity flow to and from the first electric machine 66 and the second electric machine 72. By controlling the operation of the second electric machine 72, the controller 90 also controls the planetary gearset 82, as selection of the various ratios depends on the rotational speed of the ring gear 88 and, thus, second rotor 76 of the second electric machine 72. Accordingly, the controller 90 can make real-time adjustments to the electrical power split between the first and second electric machines 66, 72 based on the current operating parameters of the internal combustion engine 22, the turbine 54, and the compressor 60. The controller 90 may therefore be electrically connected to, or may otherwise communicate with, a plurality of sensors (not shown) for measuring operating parameters of the internal combustion engine 22 (e.g. intake air flow, exhaust gas flow, throttle position, etc.) and the rotational speeds of the turbine shaft 56, the compressor shaft 62, the sun gear 84, the planet gear(s) 86, the ring gear 88, the transfer gear 89, the auxiliary gear 87, the first rotor 70, the second rotor 76, the rotating shaft 77, and/or the engine primary shaft 26.

The controller 90 implements a method of controlling the turbocharger apparatus 20. The method includes the steps of controlling the first and second electric machines 66, 72 to neither generate nor draw electricity and using the planetary gearset 82 to provide the first ratio. When the planetary gearset 82 is configured to provide the first ratio, the planetary gearset 82 transfers all mechanical power generated by the turbine 54 to the compressor 60 such that only the turbine 54 drives the compressor 60. The controller 90 may perform this step by applying electricity to the second electric machine 72 such that the second stator 74 opposes rotation of the second rotor 76 and holds the ring gear 88 in place relative to the sun gear 84. The step of using the planetary gearset 82 to provide the first ratio also may include using the turbine 54 to drive the sun gear 84 of the planetary gearset 82, using the sun gear 84 to drive the planet gears 86 of the planetary gearset 82, using the planet gears 86 to drive the compressor 60, and controlling the second electric machine 72 to prevent rotation of the ring gear 88 relative to the sun gear 84 such that all of the mechanical power generated by the turbine 54 is transferred to the compressor 60.

The method further includes the steps of using the internal combustion engine 22 to drive the first electric machine 66, controlling the first electric machine 66 to generate electricity in response to being driven by the internal combustion engine 22, supplying the electricity generated by the first electric machine 66 to the second electric machine 72 to power the second electric machine 72, and using the planetary gearset 82 to provide a third ratio. When the planetary gearset 88 is configured to provide the third ratio, the planetary gearset 82 transfers the mechanical power produced by the turbine 54 and the second electric machine 72 to the compressor 60 such that both the turbine 54 and the second electric machine 72 drive the compressor 60. The method may also include the step of using the planetary gearset 82 to provide a second ratio. When the planetary gearset 82 is configured to provide the second ratio, the planetary gearset 82 transfers some of the mechanical power produced by the turbine 54 to the compressor 60 and some of the mechanical power produced by the turbine 54 to the second electric machine 72 such that the turbine 54 drives both the compressor 60 and the second electric machine 72. The method may further include the steps of controlling the second electric machine 72 to generate electricity in response to being driven by the turbine 54, supplying the electricity generated by the second electric machine 72 to the first electric machine 66 to power the first electric machine 66, and using the first electric machine 66 to increase rotational power of the internal combustion engine 22.

In accordance with this method, the step of using the planetary gearset 82 to provide the second ratio may include using the turbine 54 to drive the sun gear 84 of the planetary gearset 82 at a rotational speed, using the sun gear 84 to drive the planet gears 86 of the planetary gearset 82, using the planet gears 86 to drive the ring gear 88 of the planetary gearset 82 and the compressor 60, using the ring gear 88 to drive the second electric machine 72, and controlling the second electric machine 72 to limit a rotational speed of the ring gear 88 to the rotational speed of the sun gear 84 (i.e. act as a brake) such that any excess mechanical power generated by the turbine 54 is transferred to the second electric machine 72 via the ring gear 88 for electricity generation. The step of using the planetary gearset 82 to provide the third ratio may include using the turbine 54 to drive a sun gear 84 of the planetary gearset 82 at a rotational speed, using the sun gear 84 to drive the planet gears 86 of the planetary gearset 82, using the planet gears 86 to drive the ring gear 88 of the planetary gearset 82 and the compressor 60, and controlling the second electric machine 72 to drive the ring gear 88 at a rotational speed that exceeds the rotational speed of the sun gear 84 such that the second electric machine 72 increases the rotational speed of the ring gear 88, the planet gears 86, and the compressor 60. In accordance with these steps, the controller 90 may compare signals generated by sensors (not shown) measuring the rotational speeds of the turbine shaft 56 or the sun gear 84 and the ring gear 88 or the rotating shaft 77 of the second electric machine 72.

The step of using the planetary gearset 82 to provide the third ratio may be performed when intake air flow to the internal combustion engine 22 is undersupplied (e.g., is less than engine airflow requirements). Conversely, the step of using the planetary gearset 82 to provide the second ratio may be performed when intake air flow to the internal combustion engine 22 is oversupplied (e.g., exceeds engine airflow requirements). The step of using the planetary gearset 82 to provide the first ratio may be performed when intake air flow to the internal combustion engine 22 meets, but does not exceed, engine airflow requirements. As such, the controller 90 may compare signals generated by one or more sensors (not shown) measuring intake air flow (e.g. mass air flow sensors, boost pressure sensors, etc.) to the engine airflow requirements for a given engine operating speed and throttle position. It should also be appreciated the internal combustion engine 22 has an engine operating range and that selection of the first, second, and third ratios by the controller 90 may be made in response to the engine operating speed in relation to the engine operating range. By way of example and without limitation, the step of using the planetary gearset 82 to provide the third ratio may be performed when the internal combustion engine 22 is operating in a lower half of the engine operating range, and particularly when the throttle position is also more than half way opened. Conversely, the step of using the planetary gearset 82 to provide the second ratio may be performed when the internal combustion engine 22 is operating in an upper half of the engine operating range, and particularly when the throttle position is also more than half way closed. Finally, the step of using the planetary gearset 82 to provide the first ratio may be performed when the internal combustion engine 22 is operating in the upper half of the engine operating range, and particularly when the throttle position is also more than half way opened.

To illustrate the example set forth above, the internal combustion engine 22 may have an engine operating range encompassing 500 to 5,500 revolutions per minute (rpms). The lower half of the engine operating range in this example encompasses 500 to 3,000 rpms and the upper half of the engine operating range encompasses 3,000 to 5,500 rpms. In the lower half of the engine operating range, exhaust flow from the internal combustion engine 22 to the turbine 54 is comparatively low to exhaust flow in the upper half of the engine operating range. When the throttle position is more than half way opened while the internal combustion engine 22 is in the lower half of the engine operating range, the power output of the internal combustion engine 22 may be limited by intake air flow because the lack of exhaust flow through the turbine 54 prevents the compressor 60 from quickly "spooling up" and supplying increased intake air flow to the internal combustion engine 22. This phenomenon is often referred to as "turbo lag." When these operating conditions are present, the controller 90 can help reduce turbo lag by performing the steps of the disclosed method, including using the planetary gearset 82 to provide the third ratio, because the second electric machine 72 is used in the third ratio to help drive the compressor 60. When the throttle position is more than half way closed while the internal combustion engine 22 is in the upper half of the engine operating range, the exhaust flow of the internal combustion engine 22 may exceed the requirements of the turbine 54 and compressor 60 of turbocharger apparatus 20. When these operating conditions are present, the controller 90 can increase the efficiency of the internal combustion engine 22 by performing the steps of the disclosed method, including using the planetary gearset 82 to provide the second ratio, because the second electric machine 72 is used in the second ratio to convert the energy of the excess exhaust gases into electricity, which is then used to augment the power output of the internal combustion engine 22 (or to charge batteries for later use by the first and/or second electric machines 66, 72). Finally, when the throttle position is more than half way opened while the internal combustion engine 22 is in the upper half of the engine operating range, all or most of the exhaust flow produced by the internal combustion engine 22 is required to drive the turbine 54 and the compressor 60 of turbocharger apparatus 20. When these operating conditions are present, the controller 90 effectively deactivates the first and second electric machines 66, 72 by performing the steps of the disclosed method, including using the planetary gearset 82 to provide the first ratio, where the ring gear 88 is not allowed to rotate relative to the sun gear 84. Accordingly, the turbocharger apparatus 20 acts like a conventional turbocharger when the first ratio is selected because the planetary gear set 82 transfers all rotational power from the turbine 54 to the compressor 60 and the first and second electric machines 66, 72 have no effect on the turbocharger apparatus 20 or the internal combustion engine 22.

In this application, the term "controller" may be replaced with the term "circuit." The term "controller" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip. The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

Figure 7:
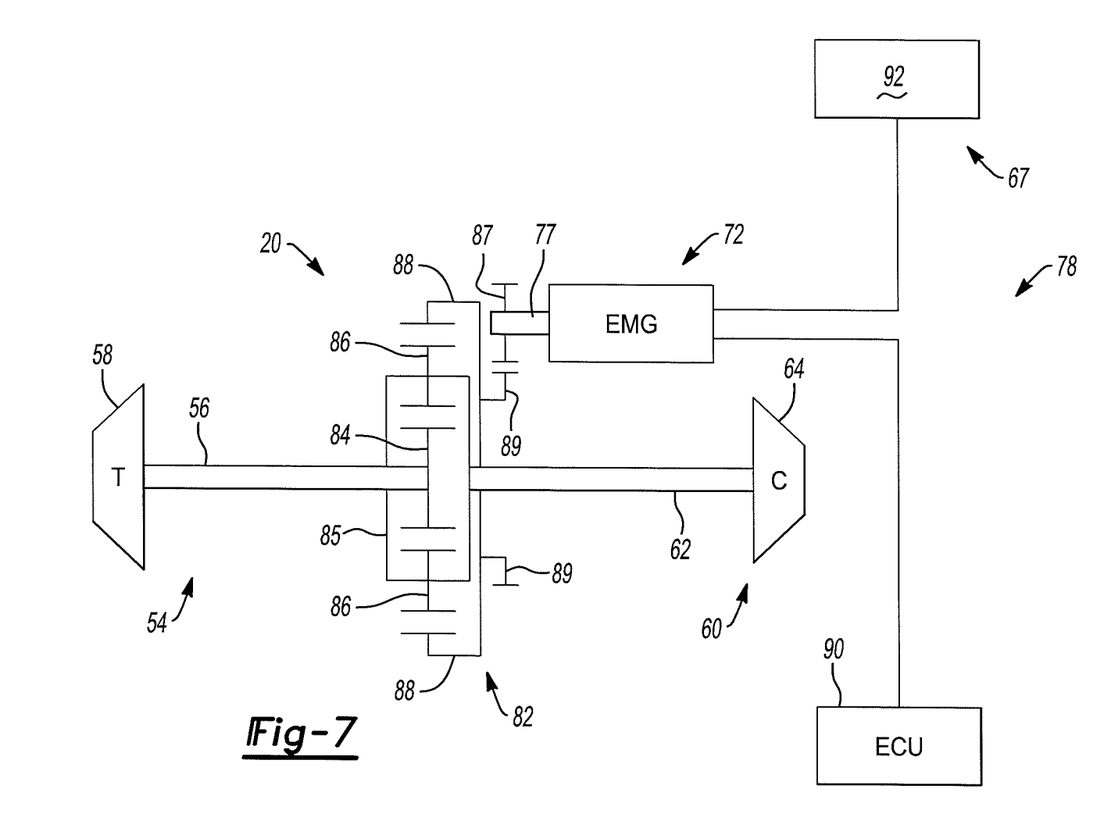
FIG. 7 is a schematic diagram of another exemplary turbocharger apparatus constructed in accordance with the present disclosure where the exemplary turbocharger apparatus includes an electric machine that is electrically connected to an electricity source.

With reference to FIG. 7, a variation of the turbocharger apparatus 20 is illustrated where only one electric machine 72 is provided. The electric machine 72 is rotatably coupled to the turbine 54, the compressor 60, or both. The electric machine 72 is electrically connected to the electricity source 67 by the electrical power coupling 80. Although the electricity source 67 may be a variety of different components, including another electric machine 66 (FIGS. 3-6), in the arrangement shown in FIG. 7, the electricity source 67 is a battery 92 or a bank of multiple batteries (not shown). As such, the turbocharger apparatus 20 may be used in conjunction with hybrid-electric drive systems found in many of today's vehicles. In the electricity generating state, the electric machine 72 generates electricity such that electricity flows from the electric machine 72 and to the battery 92. In the electricity consuming state, electricity flows in the opposite direction from the battery 92 to the electric machine 72 such that the electric machine 72 rotationally drives the turbine 54 and/or the compressor 60. The planetary gearset 82 connects the turbine 54, the compressor 60, and the electric machine 72. During operation, the planetary gearset 82 varies the rotational speeds of the turbine 54, the compressor 60, and the electric machine 72 with respect to one another depending on electricity flow between the electric machine 72 and the battery 92. In so doing, the efficiency and power of the internal combustion engine 22 can be maximized. For example, the electric machine 72 may drive the compressor 60 during instances of low exhaust flow through the turbine 54 (e.g. low engine operating speeds) and may generate electricity during instances where the flow of intake air through the compressor 60 exceeds the requirements of the internal combustion engine 22. Accordingly, turbo lag can be reduced or eliminated, the battery 92 remains charged, and/or the electricity generated by the electric machine 72 can be used to power other electricity consuming components of the internal combustion engine 22 or the vehicle.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A turbocharger apparatus of an internal combustion engine comprising:
   a turbine mounted on a turbine shaft;
   a compressor mounted on a compressor shaft;
   an electric machine with a rotating shaft rotatably coupled to at least one of said turbine and said compressor that generates electricity in an electricity generating state where electricity flows from said electric machine and that rotationally drives at least one of said turbine and said compressor in an electricity consuming state where electricity flows to said electric machine;
   a planetary gearset;
   wherein said planetary gearset further includes:
      a sun gear rotatably coupled to said turbine shaft;
      at least one planet gear rotatably coupled to said compressor shaft; and
      a ring gear rotatable coupled to said rotating shaft of said electric machine
   an auxiliary gear rotatably coupled to and carried on said rotating shaft of said electric machine; and
   a transfer gear rotatably coupled to and extending from said ring gear that is meshingly engaged with said auxiliary gear such that said auxiliary gear and said transfer gear rotatable couple said ring gear and said electric machine.

2. The turbocharger apparatus as set forth in claim 1 further comprising:
   an electricity source; and
   an electrical power coupling electrically connected to said electric machine and said electricity source that transports electricity therebetween.

3. The turbocharger apparatus as set forth in claim 2 wherein said electricity source is another electric machine that is rotatably coupled to the internal combustion engine.

4. The turbocharger apparatus as set forth in claim 2 wherein said electricity source is a battery that is configured to store electricity.

5. The turbocharger apparatus as set forth in claim 2 further comprising:
   a controller in electrical communication with said electric machine that controls electricity flow to and from said electric machine.

6. The turbocharger apparatus as set forth in claim 1 wherein
   said ring gear is disposed circumferentially about and radially spaced from said sun gear and is coupled to said rotating shaft of said electric machine; and
   wherein said at least one planet gear is disposed radially between and in meshing engagement with said sun gear and said ring gear, and is carried on a carrier that is rotatably coupled with said compressor shaft.

7. The turbocharger apparatus as set forth in claim 6 wherein said planetary gearset provides a first ratio where said electric machine holds said ring gear fixed in place such that all mechanical power generated by said turbine is transferred through said planetary gearset to said compressor via said sun gear, said at least one planet gear, and said carrier.

8. The turbocharger apparatus as set forth in claim 6 wherein said planetary gearset provides a second ratio where said electric machine rotates said ring gear at a rotational speed that equals a rotational speed of said sun gear and said turbine such that excess mechanical power generated by said turbine is used by said electric machine for electricity generation.

9. The turbocharger apparatus as set forth in claim 6 wherein said planetary gearset provides a third ratio where said electric machine rotates said ring gear at a rotational speed that exceeds a rotational speed of said sun gear and said turbine such that said electric machine supplies additional rotational energy to said compressor shaft via said ring gear, said at least one planet gear, and said carrier.

10. A turbocharger apparatus of an internal combustion engine comprising:
    a turbine mounted on a turbine shaft;
    a compressor mounted on a compressor shaft;
    a first electric machine rotatably coupled to the internal combustion engine that generates electricity in an electricity generating state where electricity flows from said first electric machine and that adds rotational power to the internal combustion engine in an electricity consuming state where electricity flows to said first electric machine;
    a second electric machine electrically connected to said first electric machine, said second electric machine having a rotating shaft that is rotatably coupled to at least one of said turbine and said compressor that generates electricity in an electricity generating state where electricity flows from said second electric machine and that rotationally drives at least one of said turbine and said compressor in an electricity consuming state where electricity flows to said second electric machine;
    a planetary gearset;
    wherein said planetary gearset further includes:
       a sun gear rotatably coupled to said turbine shaft;
       at least one planet gear rotatably coupled to said compressor shaft; and
       a ring gear rotatably coupled to said rotating shaft of said second electric machine;
    wherein said planetary gearset varies rotational speeds of said turbine shaft, said compressor shaft, and said rotating shaft of said second electric machine with respect to one another in response to electricity flow to and from said second electric machine in order to maximize efficiency and power of the internal combustion engine;
an auxiliary gear rotatably coupled to and carried on said rotating shaft of said electric machine; and
a transfer gear rotatably coupled to and extending from said ring gear that is meshingly engaged with said auxiliary gear such that said auxiliary gear and said transfer gear rotatably couple said ring gear and said electric machine.

11. The turbocharger apparatus as set forth in claim 10 further comprising:
a controller in electrical communication with said first electric machine and said second electric machine that controls electricity flow to and from said first electric machine and said second electric machine by adjusting an electrical load applied to each of said first electric machine and said second electric machine.

12. The turbocharger apparatus as set forth in claim 11 further comprising:
an electrical power coupling electrically connected to said first electric machine and said second electric machine that transfers electricity therebetween.

13. The turbocharger apparatus as set forth in claim 10 wherein
said ring gear is disposed circumferentially about and radially spaced from said sun gear and is coupled to said rotating shaft of said second electric machine; and
wherein said at least one planet gear is disposed radially between and in meshing engagement with said sun gear and said ring gear, and is carried on a carrier that is rotatably coupled with said compressor shaft.

14. The turbocharger apparatus as set forth in claim 13 wherein said planetary gearset provides a first ratio where said second electric machine holds said ring gear fixed in place such that all mechanical power generated by said turbine is transferred through said planetary gearset to said compressor via said sun gear, said at least one planet gear, and said carrier.

15. The turbocharger apparatus as set forth in claim 13 wherein said planetary gearset provides a second ratio where said second electric machine rotates said ring gear at a rotational speed that equals a rotational speed of said sun gear and said turbine such that excess mechanical power generated by said turbine is used by said second electric machine for electricity generation.

16. The turbocharger apparatus as set forth in claim 13 wherein said planetary gearset provides a third ratio where said second electric machine rotates said ring gear at a rotational speed that exceeds a rotational speed of said sun gear and said turbine such that said second electric machine supplies additional rotational energy to said compressor shaft via said ring gear, said at least one planet gear, and said carrier.

17. The turbocharger apparatus as set forth in claim 10 wherein said first electric machine includes a first stator and a first rotor rotatably coupled to an engine primary shaft of the internal combustion engine such that said first rotor rotates with respect to said first stator to generate electricity when said first electric machine is in said electricity generating state and such that said first rotor rotationally drives the engine primary shaft when said first electric machine is in said electricity consuming state.

18. The turbocharger apparatus as set forth in claim 17 wherein said second electric machine includes a second stator and a second rotor rotatably coupled to at least one of said turbine and said compressor through said planetary gearset such that said second rotor rotates with respect to said second stator to generate electricity when said second electric machine is in said electricity generating state and such that said second rotor rotationally drives at least one of said turbine and said compressor when said second electric machine is in said electricity consuming state.

19. The turbocharger apparatus as set forth in claim 10 further comprising:
a turbocharger housing defining an exhaust passage that transports exhaust gases away from the internal combustion engine and an intake passage that transports intake air towards the internal combustion engine,
wherein said turbine is at least partially disposed within said exhaust passage of said turbocharger housing and includes and a plurality of turbine vanes rotatably coupled with said turbine shaft that are propelled by the exhaust gases flowing through said exhaust passage to rotationally drive said turbine shaft, and
wherein said compressor is at least partially disposed within said intake passage of said turbocharger housing and includes and a plurality of compressor vanes rotatably coupled with said compressor shaft that increase the intake air flow through said intake passage in response to rotation of said compressor shaft.

20. The turbocharger apparatus as set forth in claim 10 wherein said compressor shaft is separate from and not directly connected to said turbine shaft.

21. The turbocharger apparatus as set forth in claim 20 wherein said turbine shaft and said compressor shaft are connected to one another through only said planetary gearset.

22. A method of controlling a turbocharger apparatus having a turbine, a compressor, a planetary gearset having a sun gear, at least one planet gear, and a ring gear, a first electric machine, a second electric machine, an auxiliary gear rotatably coupled to and carried on a rotating shaft of said second electric machine, and a transfer gear rotatably coupled to and extending from said ring gear being meshingly engaged with said auxiliary gear such that said auxiliary gear and said transfer gear rotatably couple said ring gear and said second electric machine,
the method comprising the steps of:
driving the turbine with exhaust gas flow from an internal combustion engine, the turbine generating mechanical power in response to being driven by the exhaust gas flow;
transferring all of the mechanical power generated by the turbine through the planetary gearset to the compressor during a first operating mode where only the turbine drives the compressor;
driving the first electric machine with the internal combustion engine, the first electric machine generating electricity in response to being driven by the internal combustion engine;
supplying the electricity generated by the first electric machine to the second electric machine to drive the second electric machine; and
transferring the mechanical power produced by the turbine and the second electric machine through the planetary gearset to the compressor during a second operating mode where both the turbine and the second electric machine drive the compressor.

23. The method set forth in claim 22 further comprising the steps of:

transferring some of the mechanical power produced by the turbine through the planetary gearset to the compressor and some of the mechanical power produced by the turbine through the planetary gearset to the second electric machine during a third operating mode, where the turbine drives both the compressor and the second electric machine, the second electric machine generating electricity in response to being driven by the turbine;

supplying the electricity generated by the second electric machine to the first electric machine to drive the first electric machine; and transferring the mechanical power produced by the first electric machine to the internal combustion engine to increase rotational power of the internal combustion engine.

24. The method set forth in claim 23 wherein, during the third operating mode,
the turbine drives the sun gear of the planetary gearset at a rotational speed,
the sun gear drives the at least one planet gear of the planetary gearset,
the at least one planet gear drives the ring gear of the planetary gearset and the compressor,
the ring gear drives the second electric machine, and
the second electric machine limits a rotational speed of the ring gear to the rotational speed of the sun gear such that any excess mechanical power generated by the turbine is transferred to the second electric machine via the ring gear for electricity generation.

25. The method set forth in claim 23 wherein the third operating mode is performed when intake air flow to the internal combustion engine is oversupplied.

26. The method set forth in claim 22 wherein, during the first operating mode,
the turbine drives the sun gear of the planetary gearset,
the sun gear drives the at least one planet gear of the planetary gearset,
the at least one planet gear drives the compressor, and
the second electric machine prevents rotation of the ring gear relative to the sun gear such that all of the mechanical power generated by the turbine is transferred to the compressor.

27. The method set forth in claim 22 wherein, during the second operating mode,
the turbine drives the sun gear of the planetary gearset at a rotational speed,
the sun gear drives the at least one planet gear of the planetary gearset,
the at least one planet gear drives the ring gear of the planetary gearset and the compressor, and
the second electric machine drives the ring gear at a rotational speed that exceeds the rotational speed of the sun gear such that the second electric motor increases a rotational speed of the ring gear, the at least one planet gear, and the compressor.

28. The method set forth in claim 22 wherein the first operating mode is performed when intake air flow to the internal combustion engine meets but does not exceed engine airflow requirements.

29. The method set forth in claim 22 wherein the second operating mode is performed when intake air flow to the internal combustion engine is undersupplied.

* * * * *

UNITED STATES PATENT AND TRADEMARK OFFICE
CERTIFICATE OF CORRECTION

PATENT NO. : 9,752,496 B2  
APPLICATION NO. : 14/804535  
DATED : September 5, 2017  
INVENTOR(S) : Gustav R. Johnson Page 1 of 1

It is certified that error appears in the above-identified patent and that said Letters Patent is hereby corrected as shown below:

Column 17  
Line 45, Claim 1    delete "rotatable" and insert --rotatably--

Column 17  
Line 52, Claim 1    delete "rotatable" and insert --rotatably--

Signed and Sealed this  
Twelfth Day of December, 2017

Joseph Matal  
*Performing the Functions and Duties of the*  
*Under Secretary of Commerce for Intellectual Property and*  
*Director of the United States Patent and Trademark Office*